(12) United States Patent
Hartley

(10) Patent No.: US 12,458,005 B2
(45) Date of Patent: Nov. 4, 2025

(54) WEEDLESS TROLLING HEAD SYSTEM AND METHODS OF MAKING AND USING THE SAME

(71) Applicant: Michael Hartley, Raleigh, NC (US)

(72) Inventor: Michael Hartley, Raleigh, NC (US)

( * ) Notice: Subject to any disclaimer, the term of this patent is extended or adjusted under 35 U.S.C. 154(b) by 63 days.

(21) Appl. No.: 17/865,445

(22) Filed: Jul. 15, 2022

(65) Prior Publication Data

US 2023/0019432 A1 Jan. 19, 2023

Related U.S. Application Data

(60) Provisional application No. 63/222,609, filed on Jul. 16, 2021.

(51) Int. Cl.
| | | |
|---|---|---|
| A01K 83/06 | (2006.01) | |
| A01K 83/00 | (2006.01) | |
| A01K 85/00 | (2006.01) | |
| A01K 85/02 | (2006.01) | |

(52) U.S. Cl.
CPC .......... *A01K 83/061* (2022.02); *A01K 83/063* (2022.02); *A01K 83/069* (2022.02); *A01K 85/02* (2013.01); *A01K 85/021* (2022.02); *A01K 85/025* (2022.02); *A01K 85/1853* (2022.02)

(58) Field of Classification Search
CPC .... A01K 83/06; A01K 83/061; A01K 83/063; A01K 85/02; A01K 85/021; A01K 85/022; A01K 85/024; A01K 85/025; A01K 85/1851; A01K 85/1853

USPC ....... 43/44.2, 44.4, 44.6, 42.4, 42.42, 42.43, 43/42.1, 42.36, 42.05

See application file for complete search history.

(56) References Cited

U.S. PATENT DOCUMENTS

| | | | | |
|---|---|---|---|---|
| 339,952 | A * | 4/1886 | Wakeman | A01K 83/06 |
| | | | | 43/44.4 |
| 422,226 | A * | 2/1890 | Kestner | A01K 83/06 |
| | | | | 43/41 |

(Continued)

FOREIGN PATENT DOCUMENTS

| | | | | |
|---|---|---|---|---|
| CA | 2198942 C | * | 6/2006 | ............ A01K 83/06 |
| DE | 674313 C | * | 4/1939 | |

(Continued)

*Primary Examiner* — Darren W Ark
(74) *Attorney, Agent, or Firm* — Ashley D. Johnson; Dogwood Patent and Trademark Law

(57) ABSTRACT

The invention is directed to a device that allows trolled lures (e.g., ballyhoo) to be used with decreased or eliminated snagging of the lure on grasses and weeds present in the water. The device includes a hollow, tubular body with a nose operably connected to a series of ribs via upper and/or lower arms. The connection of the ribs and arms create a tapered shape that mimics the head portion of an artificial or dead bait lure. The device further includes an upper channel that spans the length of the device, allowing fishing line to pass therethrough during use. One end of a hook guard (e.g., artificial worm) attaches to a peg positioned on the lower device arm. The second end of the hook guard slips over the point and barb of the fishing hook present on the lure. As a result, the sharp ends of the lure hook are prevented from being caught or hung by sargassum grass and other marine grasses (bay grass, sea grass, turtle grass, etc.).

16 Claims, 9 Drawing Sheets

(56) References Cited

U.S. PATENT DOCUMENTS

| | | | | |
|---|---|---|---|---|
| 556,494 A * | 3/1896 | Dales | A01K 83/06 | 43/41 |
| 797,161 A * | 8/1905 | West | A01K 83/06 | 43/44.4 |
| 841,951 A * | 1/1907 | Evans | A01K 83/06 | 43/44.4 |
| 862,150 A * | 8/1907 | Fredricks | A01K 83/06 | 43/44.4 |
| 914,478 A * | 3/1909 | Bradley et al. | A01K 83/06 | 43/44.4 |
| 993,374 A * | 5/1911 | Homgreen | A01K 83/06 | 43/41 |
| 1,025,695 A * | 5/1912 | Gibson | A01K 83/06 | 43/44.4 |
| 1,105,172 A * | 7/1914 | Anschutz | A01K 83/06 | 43/44.4 |
| 1,247,935 A * | 11/1917 | Conway | A01K 83/06 | 43/41 |
| 1,286,095 A * | 11/1918 | Powell | A01K 83/06 | 43/44.4 |
| 1,452,377 A * | 4/1923 | Hanselman | A01K 83/06 | 43/44.4 |
| 1,464,571 A * | 8/1923 | Hanson | A01K 83/06 | 43/44.4 |
| 1,613,113 A * | 1/1927 | Leu | A01K 83/06 | 43/44.4 |
| 1,814,450 A * | 7/1931 | Nelson | A01K 83/06 | 43/44.2 |
| 1,816,725 A * | 7/1931 | Freeman | A01K 85/16 | 43/41 |
| 2,359,410 A * | 10/1944 | Edwards | A01K 83/06 | 43/41 |
| 2,461,755 A * | 2/1949 | Miller | A01K 83/06 | 43/44.8 |
| 2,467,971 A * | 4/1949 | Frair | A01K 83/06 | 43/42.22 |
| 2,518,593 A * | 8/1950 | Bell | A01K 83/06 | 43/44.2 |
| 2,557,577 A * | 6/1951 | Soma | A01K 83/06 | 43/41 |
| 2,639,536 A * | 5/1953 | Hartman | A01K 83/06 | 43/41 |
| 2,741,058 A * | 4/1956 | Allman | A01K 85/16 | 43/42.39 |
| 2,763,086 A * | 9/1956 | Johnson | A01K 83/06 | 43/44.2 |
| 2,791,056 A * | 5/1957 | Davis | A01K 85/14 | 43/41 |
| 2,828,571 A * | 4/1958 | Caplan | A01K 83/06 | 43/41 |
| 2,839,866 A * | 6/1958 | Jay | A01K 83/06 | 43/41 |
| 2,848,836 A * | 8/1958 | Dodd | A01K 83/06 | 43/44.6 |
| 2,931,123 A * | 4/1960 | Jensen, Jr. | A01K 83/06 | 43/42.46 |
| 2,937,466 A * | 5/1960 | Mays | A01K 83/06 | 43/41 |
| 3,081,576 A * | 3/1963 | Collins | A01K 83/06 | 43/53.5 |
| 3,105,319 A * | 10/1963 | Whalen | A01K 83/06 | 43/44.4 |
| 3,415,004 A * | 12/1968 | Whalen | A01K 83/06 | 43/44.4 |
| 3,640,014 A * | 2/1972 | Gurka | A01K 85/02 | 43/42.43 |
| 3,645,031 A * | 2/1972 | Egles | A01K 83/06 | 43/44.2 |
| 3,760,526 A * | 9/1973 | Hicks | A01K 83/06 | 43/44.4 |
| 3,760,529 A * | 9/1973 | Hicks | A01K 83/06 | 43/44.4 |
| 3,883,979 A * | 5/1975 | Williams, Jr. | A01K 85/16 | 43/42.28 |
| 3,893,255 A * | 7/1975 | Hicks | A01K 83/06 | 43/44.4 |
| 4,054,004 A * | 10/1977 | Schott | A01K 85/02 | 43/42.31 |
| 4,067,135 A * | 1/1978 | Martin | A01K 83/06 | 43/44.2 |
| 4,312,148 A * | 1/1982 | Hardwicke, III | A01K 85/00 | 43/42.43 |
| 4,349,979 A * | 9/1982 | Strantz | A01K 83/06 | 43/44.8 |
| 4,367,607 A * | 1/1983 | Hedman | A01K 85/00 | 43/44.8 |
| 4,615,136 A * | 10/1986 | Bank | A01K 95/00 | 43/44.92 |
| 4,848,023 A * | 7/1989 | Ryder | A01K 83/06 | 43/44.4 |
| 4,869,014 A * | 9/1989 | Francklyn | A01K 83/06 | 43/42.49 |
| 4,932,154 A * | 6/1990 | Andreetti | A01K 83/06 | 43/44.6 |
| 5,269,089 A * | 12/1993 | Gariglio | A01K 85/02 | 43/42.43 |
| 5,377,442 A * | 1/1995 | Gariglio | A01K 83/06 | 43/44.4 |
| 5,533,296 A * | 7/1996 | Jansen | A01K 83/06 | 43/44.2 |
| 5,611,168 A * | 3/1997 | Schultz | A01K 83/06 | 43/44.8 |
| 5,829,186 A * | 11/1998 | Schultz | A01K 83/06 | 43/44.8 |
| 5,893,232 A * | 4/1999 | Horton | A01K 83/06 | 43/44.4 |
| 6,061,948 A * | 5/2000 | Boucek | A01K 85/00 | 43/42.39 |
| 6,327,808 B1 * | 12/2001 | Zascavage | A01K 85/00 | 43/44.9 |
| 6,357,167 B1 * | 3/2002 | Bradford | A01K 85/00 | 43/42.31 |
| 6,571,508 B2 * | 6/2003 | Brinkman | A01K 83/06 | 43/4.5 |
| 6,658,785 B1 * | 12/2003 | Faulkner | A01K 83/06 | 43/44.2 |
| 6,708,442 B2 * | 3/2004 | Kress | A01K 83/06 | 43/44.4 |
| 7,234,267 B1 * | 6/2007 | Konstant | A01K 85/02 | 43/42.24 |
| 7,469,497 B2 * | 12/2008 | Hergott | A01K 85/02 | 43/42.43 |
| 7,621,069 B2 * | 11/2009 | Holtskampf | A01K 91/03 | 43/44.9 |
| 9,044,000 B1 * | 6/2015 | Lumsden | A01K 83/06 | |
| 11,116,191 B2 * | 9/2021 | Gamache | A01K 85/16 | |
| 12,317,875 B1 * | 6/2025 | Garrett | A01K 83/06 | |
| 2003/0037479 A1 * | 2/2003 | Wyatt | A01K 83/06 | 43/44.2 |
| 2004/0010959 A1 * | 1/2004 | Kress | A01K 83/06 | 43/44.4 |
| 2005/0268525 A1 * | 12/2005 | Kalazich | A01K 83/06 | 43/44.4 |
| 2006/0037232 A1 * | 2/2006 | Gill | A01K 85/00 | 43/44.8 |
| 2007/0089352 A1 * | 4/2007 | Hergott | A01K 85/02 | 43/42.11 |
| 2008/0163540 A1 * | 7/2008 | Ridolfi | A01K 95/00 | 43/44.9 |
| 2011/0162254 A1 * | 7/2011 | Smits | A01K 85/18 | 43/42.49 |
| 2016/0157472 A1 * | 6/2016 | Neal | A01K 85/18 | 43/41 |
| 2018/0098529 A1 * | 4/2018 | de Sousa | A01K 83/06 | |
| 2019/0082666 A1 * | 3/2019 | Copeland | A01K 95/00 | |
| 2019/0082667 A1 * | 3/2019 | Gamache | A01K 85/01 | |
| 2019/0174732 A1 * | 6/2019 | Mahaffey | A01K 83/06 | |
| 2019/0269113 A1 * | 9/2019 | Olson | A01K 83/06 | |

(56) References Cited

U.S. PATENT DOCUMENTS

| | | | |
|---|---|---|---|
| 2019/0297864 A1* | 10/2019 | League | A01K 83/06 |
| 2021/0112793 A1* | 4/2021 | Joye | A01K 83/06 |
| 2023/0189774 A1* | 6/2023 | Cortazzo | A01K 85/02 |
| | | | 43/41 |

FOREIGN PATENT DOCUMENTS

| | | | | |
|---|---|---|---|---|
| EP | 2745684 A1 * | 6/2014 | | A01K 83/02 |
| JP | 2003158960 A * | 6/2003 | | |
| JP | 2012120496 A * | 6/2012 | | |
| JP | 2014108089 A * | 6/2014 | | |
| JP | 2014161329 A * | 9/2014 | | |
| JP | 2014193131 A * | 10/2014 | | |
| JP | 2019140995 A * | 8/2019 | | A01K 83/06 |
| JP | 2021058144 A * | 4/2021 | | |
| WO | WO-0249420 A2 * | 6/2002 | | A01K 83/06 |

* cited by examiner

WEEDLESS TROLLING HEAD SYSTEM AND METHODS OF MAKING AND USING THE SAME

CROSS-REFERENCE TO RELATED APPLICATIONS

This application claims priority to U.S. Provisional Patent Application No. 63/222,609, filed Jul. 16, 2022, the entire content of which is hereby incorporated by reference.

TECHNICAL FIELD

The presently disclosed subject matter is generally directed to a weedless trolling head system. The presently disclosed subject matter further includes methods of making and using the system for weedless trolling.

BACKGROUND

Artificial fishing lures have been extensively used in both sport and commercial fishing. The lure typically is constructed to resemble edible bait (e.g., minnows, frogs, etc.) that is attractive to a fish as a food source. The lure is rigged on the outside body surface with a hook or a plurality of hooks to impale the fish when it attempts to feed on the lure. However, the hooks affixed to the exterior of the lure frequently snag on grass and other debris present in the water. In addition to losing tackle, anglers waste time dealing with clearing grass, weeds, and the like from the fishing lines. There have been many prior attempts to produce weedless lures. For example, some manufacturers have attempted to produce a weedless lure with various hook-guarding mechanisms. However, hook guards are typically cumbersome and difficult to install on lures that include multiple and/or dangling hooks. Other approaches to achieving weedless lures include the use of hidden or retracted hooks that require complicated assemblies with multiple moving pieces. Thus, conventional weedless lures suffer from lack of durability, comprise complex mechanical hook-actuating devices, are only partially effective for impaling fish, and/or have relatively high manufacturing costs. It would therefore be beneficial to provide a weedless lure system that overcomes the shortcomings of the prior art

SUMMARY

In some embodiments, the presently disclosed subject matter is directed to a device for use with a fishing lure. Specifically, the device comprises a first end and a second end, with a length therebetween. The device also includes a nose positioned at a first end of the device, the nose comprising a first nose end, a second nose end, and a body therebetween with an interior channel that spans from the first nose end to the second nose end, and a conduit positioned on an upper surface of the body that spans a length of the nose, wherein the conduit is in fluid communication with the interior channel. The device includes one or more U-shaped ribs positioned along the length of the device, each rib defined by a bottom point and first and second ends. The device includes a first upper arm and a second upper arm, wherein the first upper arm connects with the second nose end and includes a length that attaches to each rib at the rib first end, and wherein the second upper arm connects with the second nose end and includes a length that attaches to each rib at the rib second end.

In some embodiments, the disclosed device further comprises a lower arm defined by a first end that connects with the second end of the nose, wherein the lower arm includes a length that attaches to the bottom point of each rib.

In some embodiments, the disclosed device further comprises a peg attached to a bottom surface of the lower arm.

In some embodiments, the nose is tapered from the first nose end to the second nose end.

In some embodiments, the rib directly adjacent to the second end of the nose has a diameter that is greater than the diameter of the nose, and wherein the rib directly adjacent to the rib adjacent to the nose has a diameter that is greater than both the second end of the nose and the rib directly adjacent to the nose.

In some embodiments, the device comprises about 1-5 ribs.

In some embodiments, the device includes an extension positioned at the second end of the device, adjacent to the top arms, bottom arm, or both.

In some embodiments, the lower arm comprises a removable segment positioned between the second end of the nose and a rib positioned directly adjacent to the nose.

In some embodiments, the device includes a hook guard defined by a first end and a second end, wherein the first end is releasably attached to the peg and the second end is configured to be releasably attached to a hook of an artificial or dead fishing lure.

In some embodiments, the presently disclosed subject matter is directed to a method of reducing or eliminating snagging of vegetation on an artificial or dead fishing lure comprising a head and a body. Specifically, the method comprises positioning the disclosed device over the head of the fishing lure such that the lure head is positioned within the interior channel of the nose. The method includes rigging the fishing lure, wherein fishing line from the lure extends through the channel of the nose, extending out from the nose first end. The method includes positioning a first end of a hook guard over a device peg configured on an arm of the device, wherein the hook guard comprises the first end and an opposed second end. The method includes positioning the second end of the hook guard over a hook of the artificial or dead fishing lure such that a sharp end of the hook is covered by the hook guard. The method includes connecting the lure to a fishing pole and trolling or fishing, wherein the amount of vegetation snagged by the lure is eliminated or reduced compared to fishing lures without the device.

In some embodiments, the area between each rib along the length of the device comprises an aperture.

In some embodiments, the presently disclosed subject matter is directed to a kit for use with artificial or dead fishing lures. Specifically, the kit comprises a plurality of devices, each device defined by a first end and a second end, with a length therebetween. Each device includes a nose positioned at a first end of the device, the nose comprising a first nose end, a second nose end, and a body therebetween with an interior channel that spans from the first nose end to the second nose end, and a conduit positioned on an upper surface of the body that spans a length of the nose, wherein the conduit is in fluid communication with the interior channel. Each device includes one or more U-shaped ribs positioned along the length of the device, each rib defined by a bottom point and first and second ends. Each device includes a first upper arm and a second upper arm, wherein the first upper arm connects with the second nose end and includes a length that attaches to each rib at the rib first end, and wherein the second upper arm connects with the second nose end and includes a length that attaches to each rib at the rib second end. Each device has a length, thickness, or both that differs from at least one other device, thereby providing a series of devices with varying lengths, thicknesses, or both for use with a variety of artificial or dead fishing lures.

In some embodiments, each kit includes a set of instructions for use.

DETAILED DESCRIPTION

Figure 1A:
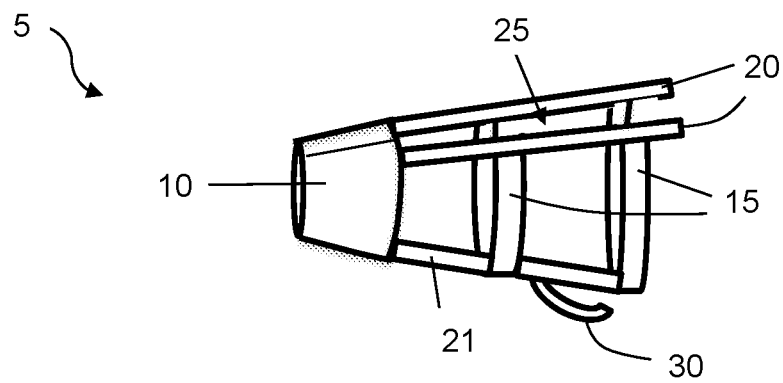
FIG. 1a is a perspective view of a weedless trolling head in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1B:
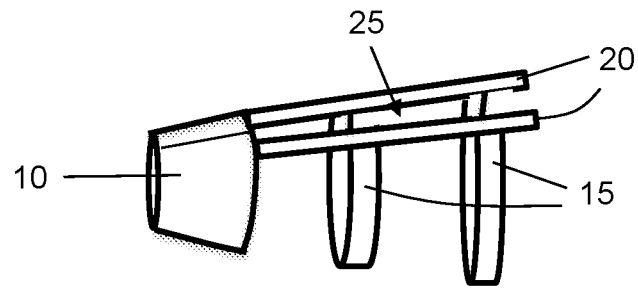
FIG. 1b is a perspective view of an alternate weedless trolling head in accordance with some embodiments of the presently disclosed subject matter.

The presently disclosed subject matter is directed to a device that allows trolled lures (e.g., ballyhoo) to be used with decreased or eliminated snagging of the lure on grasses and weeds present in the water. As shown in FIGS. 1a and 1b, device 5 includes a hollow, tubular body with nose 10 operably connected to a series of ribs 15 via upper and/or lower arms 20, 21. The connection of the ribs and arms that extend from nose 10 create a tapered shape that mimics the head portion of an artificial or dead bait lure. The device further includes upper channel 25 that spans the length of the device, allowing fishing line to pass therethrough during use, as described in detail below. In some embodiments, one end of a hook guard (e.g., artificial worm) attaches to peg 30 positioned on lower arm 21. The second end of the hook guard slips over the point and barb of the fishing hook present on the lure. As a result, the sharp ends of the lure hook are prevented from being caught or hung by sargassum grass and other marine grasses (bay grass, sea grass, turtle grass, etc.). Advantageously, device 5 allows for proper hookset on the targeted pelagic (e.g., oceanic) striking fishes, such as dorado, tuna, wahoo, mackerels, and billfishes, while also reducing or eliminating snagging of the lure on marine grasses and weeds.

Figure 2A:
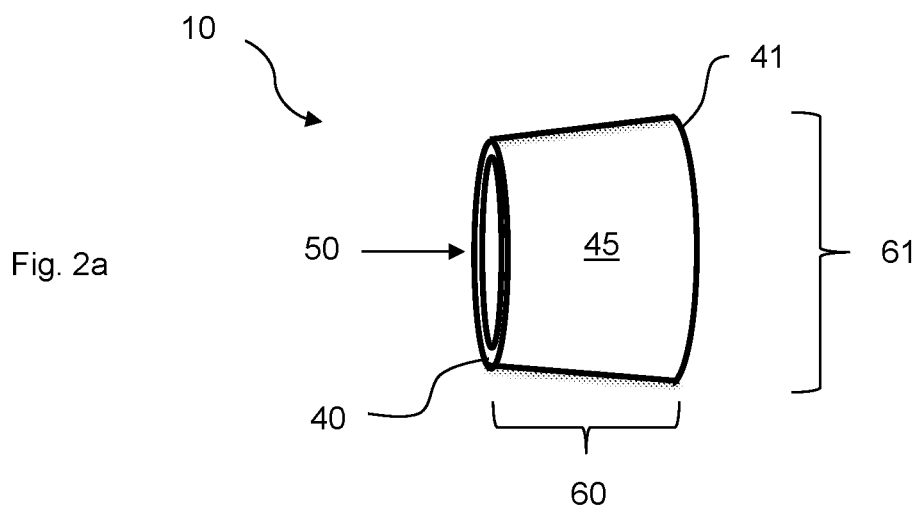
FIG. 2a is a perspective view of weedless trolling head nose in accordance with some embodiments of the presently disclosed subject matter.
Figure 2B:
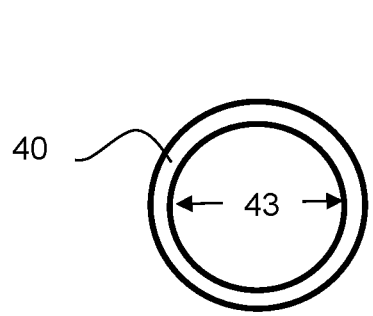
FIG. 2b is a front plan view of a nose first end in accordance with some embodiments of the presently disclosed subject matter.
Figure 2C:
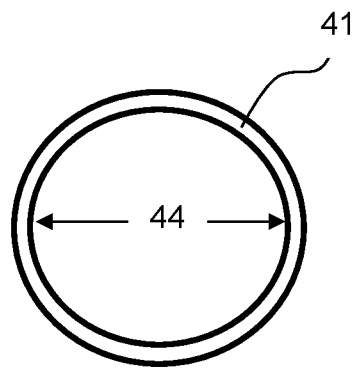
FIG. 2c is a front plan view of a nose second end in accordance with some embodiments of the presently disclosed subject matter.

As set forth above, device 5 comprises nose 10 positioned at a first end of the device. The nose includes first end 40 and second end 41 with body 45 therebetween, as shown in FIG. 2a. The nose includes a tapered design with central channel 50 sized and shaped to accommodate the head of a fishing lure. The central channel passes through the body of the nose, from first end 40 to second end 41. The term "tapered" refers to a gradually broadening of the width and/or diameter of the nose from first end 40 to second end 41. Thus, first end 40 of the nose can have diameter 43 that is about 5-80% smaller than diameter 44 of the second end of the nose (e.g., at least/no more than about 5, 10, 15, 20, 25, 30, 35, 40, 45, 50, 55, 60, 65, 70, 75, or 80%), as shown in FIGS. 2b and 2c. The term "diameter" refers to the longest straight-line cross-sectional distance that passes from one end of an element to the opposed end, and also crosses through the center of the cross-sectional element.

Nose 10 can include length 60 of about 0.25-5 inches (e.g., at least/no more than about 0.25, 0.5, 1, 1.5, 2, 2.5, 3, 3.5, 4, 4.5, or 5 inches). The term "length" refers to the longest horizontal distance between first and second ends 40, 41. The nose can also include width 61 of about 0.25-6 inches (e.g., at least/no more than about 0.25, 0.5, 1, 1.5, 2, 2.5, 3, 3.5, 4, 4.5, 5, 5.5, or 6 inches). The term "width" refers to the longest straight-line distance perpendicular to the length. It should be appreciated that the length and width of nose 10 are not limited and can be configured outside the given ranges. Nose 10 is constructed to generally resemble the head of a baitfish. Thus, the nose can have a rounded or oval cross-sectional shape in some embodiments. However, any shape can be used.

Figure 2D:
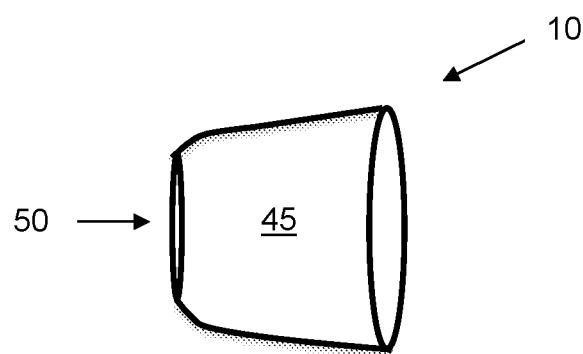
FIG. 2d is a side plan view of a rounded nose in accordance with some embodiments of the presently disclosed subject matter.

In some embodiments, the nose can be configured as cylindrical in shape, as shown in FIG. 2a. However, the presently disclosed subject matter is not limited and the device can also include a rounded nose to mimic the shape of the mouth end of a bait fish or lure more closely, as shown in the embodiment of FIG. 2d. Any shape can be used.

Figure 2E:
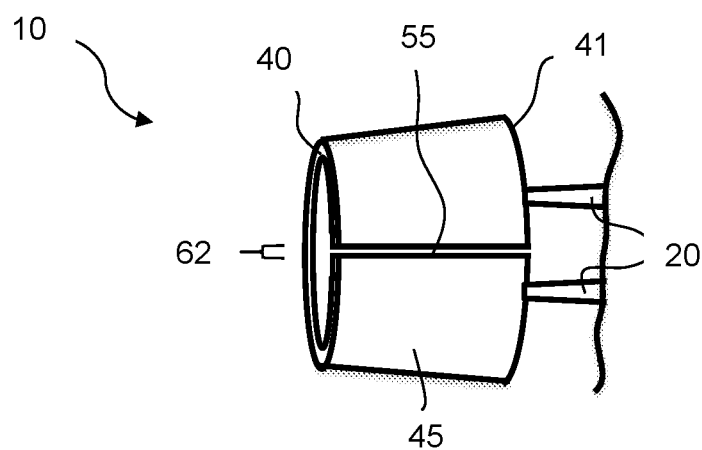
FIG. 2e is a top perspective view of weedless trolling head nose conduit in accordance with some embodiments of the presently disclosed subject matter.

Nose 10 also includes conduit 55 positioned on a top surface, adjacent to top arms 20, as illustrated in FIG. 2e. The term "conduit" refers to any opening along the length of the nose (e.g., from the front face to the rear face). The conduit is also in fluid connection with upper channel 25 and the nose central channel. The conduit has a thickness sufficient to accommodate a fishing line, allowing a baited lure line to pass through. Thus, in some embodiments the conduit can include thickness 62 of at least about (or no more than about) 0.01, 0.05, 0.1, 0.2, 0.3, 0.4, or 0.5 inches. However, it should be appreciated that the conduit thickness is not limited.

Figure 3A:
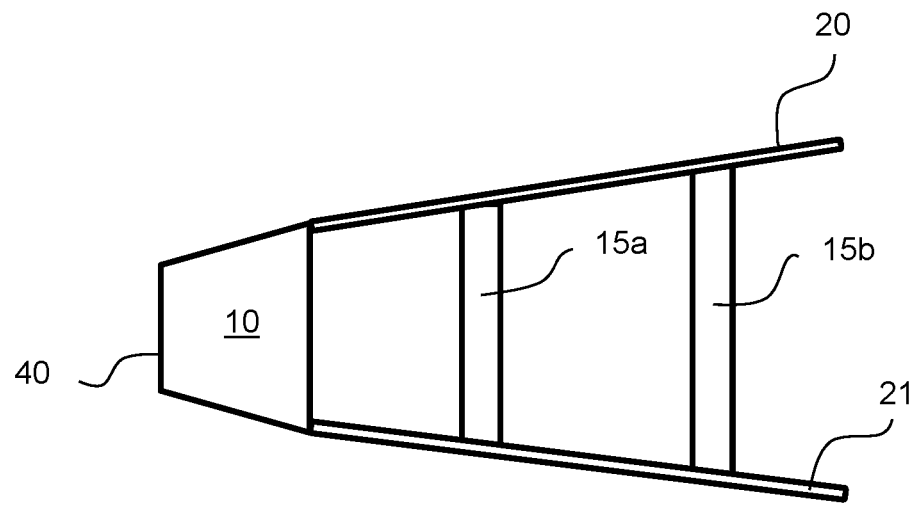
FIG. 3a is a side plan view of a weedless trolling head in accordance with some embodiments of the presently disclosed subject matter.

The device also includes a series of ribs 15 increasing in size as they advance away from nose 10, as shown in FIG. 3a. Thus, rib 15a is larger in diameter compared to nose 10. Likewise, rib 15b is larger in width and diameter compared to rib 15a. Thus, the rib directly adjacent to nose 10 has the smallest diameter of each rib present on the device. The term "directly adjacent" means an element positioned next to or beside another element with no additional elements therebetween.

Figure 3B:
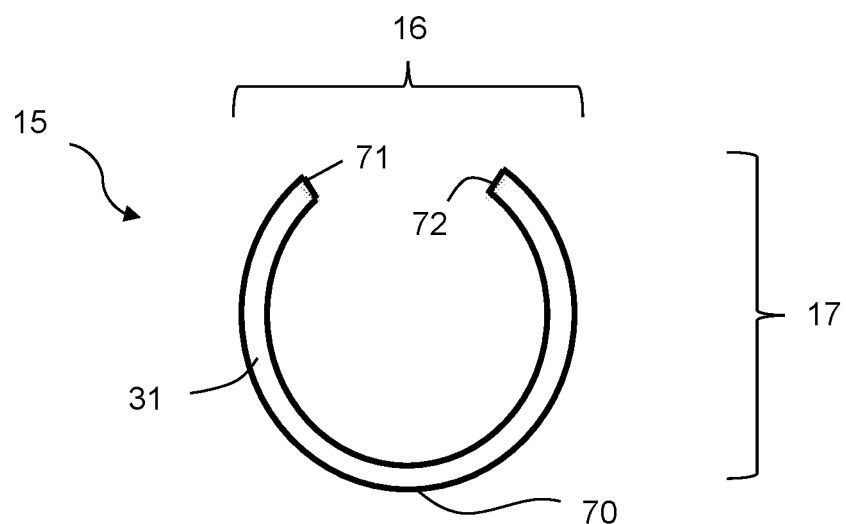
FIG. 3b is a front plan view of a device rib in accordance with some embodiments of the presently disclosed subject matter.
Figure 3C:
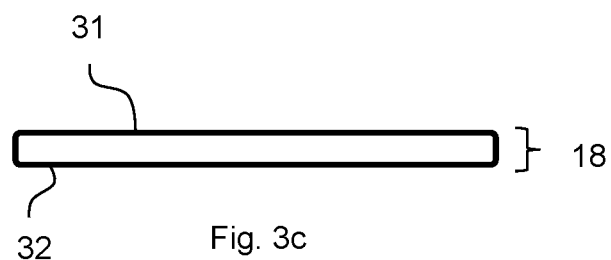
FIG. 3c is a top plan view of a device rib in accordance with some embodiments of the presently disclosed subject matter.

Each rib has a U-shaped configuration with bottom point 70 and first and second ends 71, 72 as illustrated in FIG. 3b. Each rib 15 can have a length 16 and/or width 17 of about 0.5-10 inches (e.g., at least/no more than about 0.5, 1, 1.5, 2, 2.5, 3, 3.5, 4, 4.5, 5, 5.5, 6, 6.5, 7, 7.5, 8, 8.5, 9, 9.5, or 10 inches). Length 16 and width 17 can be about equal or can differ by about 1-50 percent in some embodiments. Each rib also includes thickness 18 of about 0.01-2 inches (e.g., at least/no more than about 0.01, 0.05, 0.1, 0.25, 0.5, 0.75, 1, 1.25, 1.5, 1.75, or 2 inches), as shown in FIG. 3c. The term "thickness" refers to the width of the rib from front face 31 to opposed rear face 32.

Figure 3D:
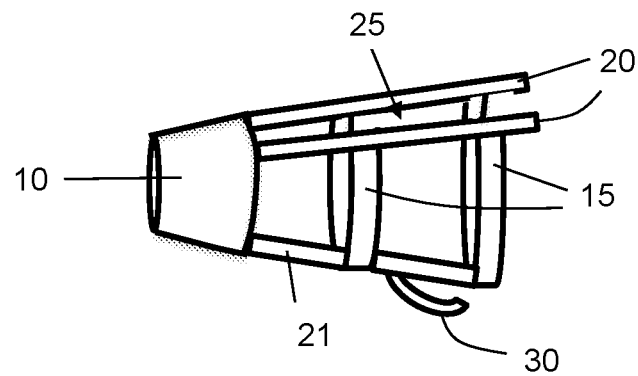
FIG. 3d is a perspective view of a weedless trolling head in accordance with some embodiments of the presently disclosed subject matter.
Figure 3E:
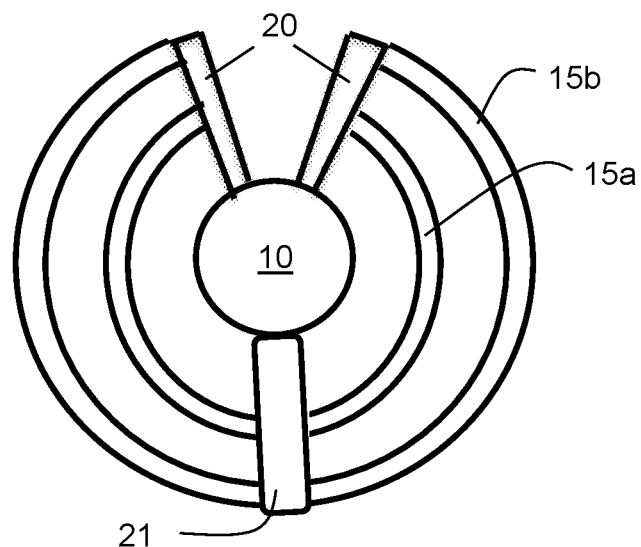
FIG. 3e is a front plan view of a weedless trolling head in accordance with some embodiments of the presently disclosed subject matter.
Figure 3F:
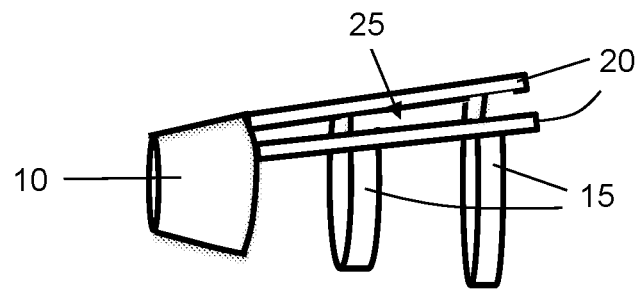
FIG. 3f is a perspective view of a weedless trolling head configured only with upper arms in accordance with some embodiments of the presently disclosed subject matter.

In some embodiments, bottom point 70 of each rib is connected to device lower arm 21, as shown in FIGS. 3d and 3e. Similarly, the rib first and second ends 71, 72 are each connected to an upper device arm 20. Ribs 15 can be permanently or releasably joined to the upper and lower arms using any suitable mechanism, such as the use of adhesives, welding, thermoforming, fasteners (e.g., screws, bolts, clips), magnets, and the like. In some embodiments, the device is configured without lower arm 21. In these embodiments, the ribs are only connected to upper arms 20, as shown in the embodiment of FIG. 3f.

In some embodiments, the distance between nose 10 and first rib 15a can be about 0.25-4 inches (e.g., at least/no more than about 0.25, 0.5, 0.75, 1, 1.5, 2, 2.5, 3, 3.5, or 4 inches). Similarly, the distance between adjacent ribs 15 can be about 0.25-4 inches (e.g., at least/no more than about 0.25, 0.5, 0.75, 1, 1.5, 2, 2.5, 3, 3.5, or 4 inches). In some embodiments, each rib is about equidistant from adjacent ribs. In other embodiments, a rib can be configured to have a distance that is about 10-50 percent greater than the distance between two other ribs.

Device 5 can include any desired number of ribs, such as (but not limited to) about 1-5. However, the presently disclosed subject matter is not limited, and the device can have greater than 5 ribs in some embodiments.

Figure 4A:
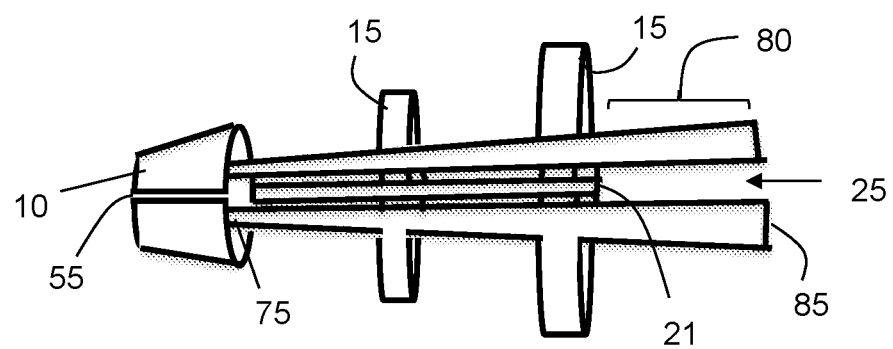
FIG. 4a is a top plan view of a weedless trolling head in accordance with some embodiments of the presently disclosed subject matter.

Each arm 20 has first end 75 and second end 85 as shown in FIG. 4a. First end 75 of each arm is attached to second end 41 of the nose using any desired mechanism (e.g., adhesives, welding, thermoforming). As shown, the top arms are configured on either side of conduit 55, creating channel 25 for fishing line attached to the artificial lure to pass. In some embodiments, the first end of bottom arm 21 is also attached to the bottom portion of the nose, as shown in FIG. 4a. In some embodiments, each arm excludes extension 80 extending past the final rib. The extension functions to retain the device on a bait fish. For example, in some embodiments the interior surface of the extension (e.g., the surface in contact with the lure) can include an inwardly curved configuration, one or more teeth, or any other desired retention element. Extensions 80 are optional, and one or more arms can be configured without an extension.

Figure 4B:
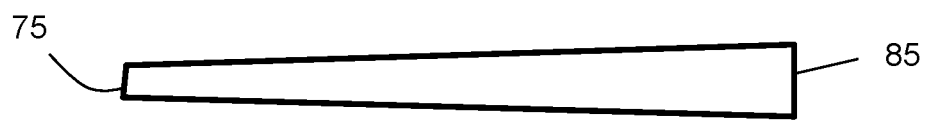
FIGS. 4b and 4c are top plan view of device top arms in accordance with some embodiments of the presently disclosed subject matter.
Figure 4C:

Top and bottom arms 20, 21 can have any desired length and/or width. For example, the arms can have a length of about 1-12 inches (e.g., at least/no more than about 1, 1.5, 2, 2.5, 3, 3.5, 4, 4.5, 5, 5.5, 6, 6.5, 7, 7.5, 8, 8.5, 9, 9.5, 10, 10.5, 11, 11.5, or 12 inches). The arm length can be measured from first end 75 to second end 85. Similarly, each arm can have width of about 0.1-1 inch (e.g., at least/no more than about 0.1, 0.2, 0.3, 0.4, 0.5, 0.6, 0.7, 0.8, 0.9, or 1 inch). However, the lengths and widths of the arms are not limited and can be configured with any desired dimensions. In some embodiments, the arms can taper, with second end 85 being wider than first end 75 which is believed to give the arms greater movement in use, as shown in FIG. 4b. Alternatively, the arms can have a constant width as shown in the embodiment of FIG. 4c, which is believed to provide greater stability to the device.

Figure 5A:
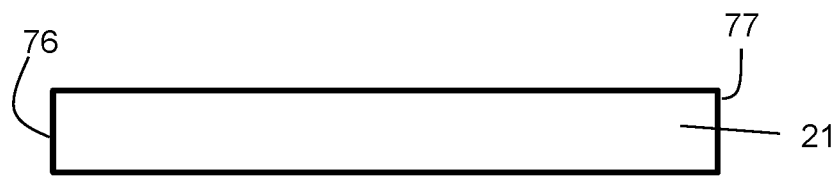
FIG. 5a is a top plan view of a device lower arm without a removable portion in accordance with some embodiments of the presently disclosed subject matter.
Figure 5B:
FIG. 5b is a top plan view of a device lower arm with a removable portion in accordance with some embodiments of the presently disclosed subject matter.
Figure 5C:
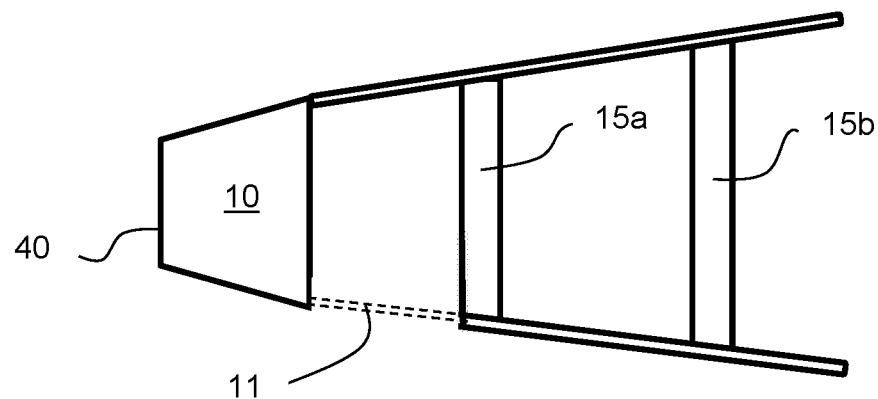
FIG. 5c is a side plan view of a weedless trolling head in accordance with some embodiments of the presently disclosed subject matter.

Optionally, lower arm 21 can include removable section 11 to accommodate a chin weighted bait, as shown in FIGS. 5a-5c. The term "chin weighted" refers to artificial lures with weights present the "chin" portion of the lure (e.g., where the chin of the fish would be if the lure were a fish). Removable section 11 can be attached and removed via any suitable connection, such as snap-fit closure, pressure-fit closure, magnets, fasteners (e.g., screws, clips), and the like. It should be appreciated that lower arm 21 is optional and the device can be configured with only upper arms 20.

Figure 5D:
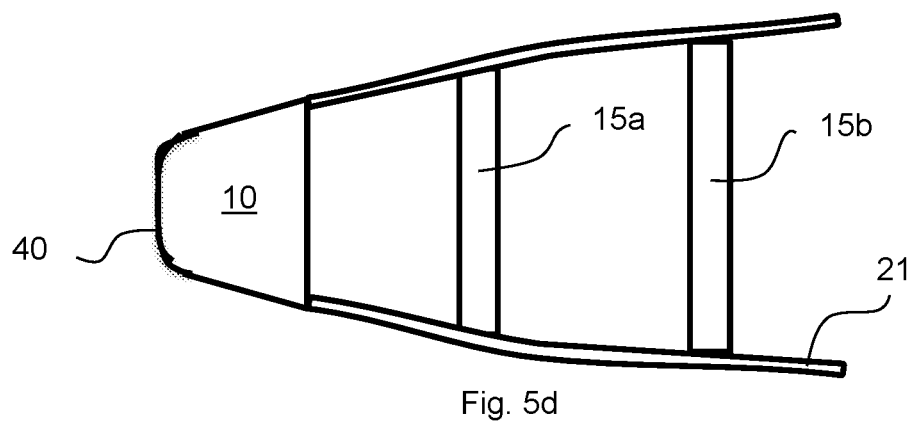
FIG. 5d is a side plan view of a streamlined weedless trolling head in accordance with some embodiments of the presently disclosed subject matter.

In some embodiments, the upper arms and nose can be contoured across the top and/or front surfaces to better match the profile of a lure (e.g., ballyhoo or baitfish) as shown in FIG. 5d. For example, instead of a straight line, the upper arms can be angled or curved.

Lower arm 21 can have a length that is approximately equal to the lengths of arms 20. For example, the lower arm can have a length of about 1-12 inches (e.g., at least/no more than about 1, 1.5, 2, 2.5, 3, 3.5, 4, 4.5, 5, 5.5, 6, 6.5, 7, 7.5, 8, 8.5, 9, 9.5, 10, 10.5, 11, 11.5, or 12 inches). The arm length can be measured from first end 76 to second end 77. The lower arm can alternatively have a length that is less than the length of the upper arms (e.g., about 20-80% shorter). Thus, in some embodiments the lower arm can have a length of about 0.5, 1, 2, 3, 4, 5, 6, 7, 8, 9, or 10 inches. In some embodiments, the length of the lower arm does not extend past the last ring (e.g., the ring farthest from nose 10).

The lower arm can have width of about 0.1-1 inch (e.g., at least/no more than about 0.1, 0.2, 0.3, 0.4, 0.5, 0.6, 0.7, 0.8, 0.9, or 1 inch). However, the length and width of the lower arm is not limited and can be configured with any desired dimensions. In some embodiments, the lower arm can taper or can have a constant width as described above for the upper arms.

Figure 6A:
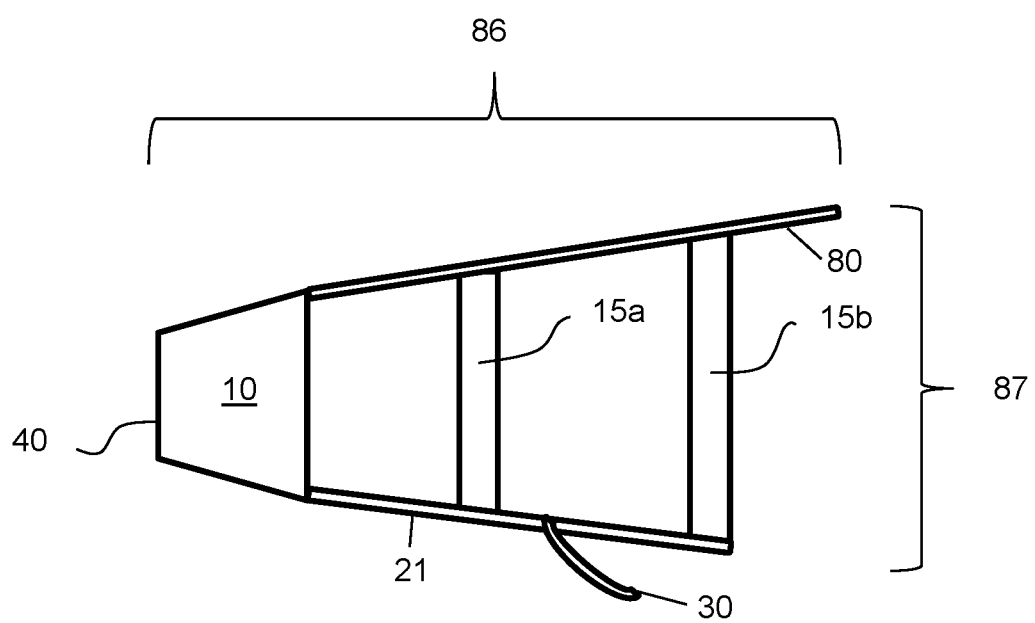
FIG. 6a is a side plan view of a weedless trolling head in accordance with some embodiments of the presently disclosed subject matter.
Figure 6B:
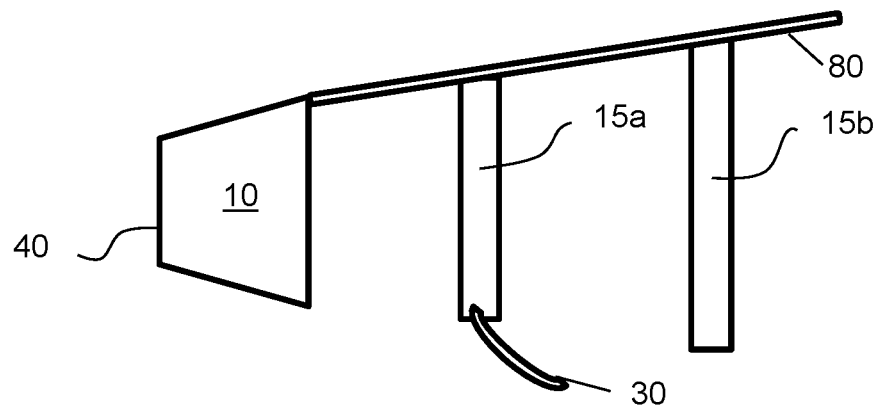
FIG. 6b is a side plan view of a weedless trolling head configured without a lower arm in accordance with some embodiments of the presently disclosed subject matter.

Device 5 further includes peg 30 positioned on a lower surface of lower arm 21, as illustrated in FIG. 6a. The term "peg" refers to any retention element sized and shaped to allow a hook guard to be fitted and adhered to. Thus, the peg can include a hook shape, sharpened end, and the like. In embodiments of device 5 configured without lower arm 21, the peg can be configured on a lower end of a rib, as shown in the embodiment of FIG. 6b.

Device 5 can be constructed from any suitable material, such as (but not limited to) metal (e.g., stainless steel, aluminum, copper), plastic (polypropylene, polyethylene, PVC, ABS, ASA, etc.) silicone, rubber, or combinations thereof. The material used to construct device 5 can be sufficiently rigid to resist deformation by normal contact with weeds as the device is used, but also resistant to be bent or maneuvered under the applied force of a striking fish.

Device 5 can be produced in any desired length and/or width. For example, as shown in FIG. 6a, device 5 can have length 86 of about 1-15 inches or more. The term "length" refers to the longest horizontal distance from the first end of nose 10 to the second end of arms 20 and/or 21 (or extension 80). Thus, the device can have length 86 of at least about (or no more than about) 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 inches. The disclosed device can further include width 87 of about 0.5-10 inches. The term "width" refers to the longest straight-line distance perpendicular to the length (e.g., the longest distanced between the top and bottom arms). Width 87 can be at least about (or no more than about) 0.5, 1, 1.5, 2, 2.5, 3, 3.5, 4, 4.5, 5, 5.5, 6, 6.5, 7, 7.5, 8, 8.5, 9, 9.5, or 10 inches. However, the presently disclosed subject matter is not limited, and the device can be configured with a length and/or width greater or less than the ranges given herein. Thus, the device can be produced in different sizes to correspond to the common industry lure sizes (e.g., small, medium, large, horse, select, etc.).

The device and associated hook guard can include any desired color or combination of colors. For example, the device and hook guard can include silver, grey, pink, green, blue, white, orange, yellow, red, purple, or combinations thereof. Any color(s) or patterns (stripes, dots, etc.) can be used. In some embodiments, the device and/or hook guard can be constructed from a reflective material (such as chrome) to reflect sunlight and produce an attractive flash visible to fish swimming in the area. The device can also include realistic looking eyes oriented on opposite sides of the nose to create the impression of a real fish.

In some embodiments, the device can include any suitable mechanism to provide a smoke trail (a stream of tiny bubbles) to the lure. The mechanisms can include (but are not limited to apertures, fins, baffles, and the like, and can be positioned at any location on device 5. For example, the nose, one or more upper arms, lower arm, and/or peg can include apertures, baffles, fins, or combinations thereof.

In use, the device is configured to be placed over the head of the rigged artificial or dead lure without interfering with the rigging or action of the bait. A "rigged" lure is a lure comprising a fishing line and/or hook attached thereto. The user can rig the bait as normal, and then slip the device onto the line and into position over the head and gill section of the rigged bait. Advantageously, conduit 55 is designed to allow a pin-rigged baitfish to be used with device 5.

Figure 7A:
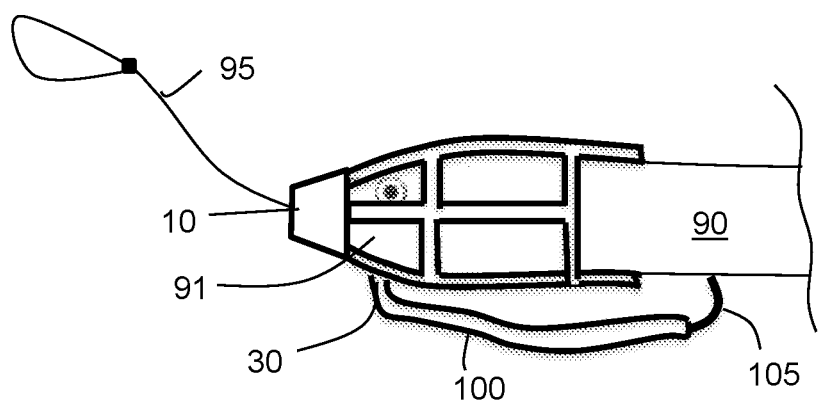
FIGS. 7a-7c are a side plan views of weedless trolling heads configured on a lure in accordance with some embodiments of the presently disclosed subject matter.
Figure 7B:
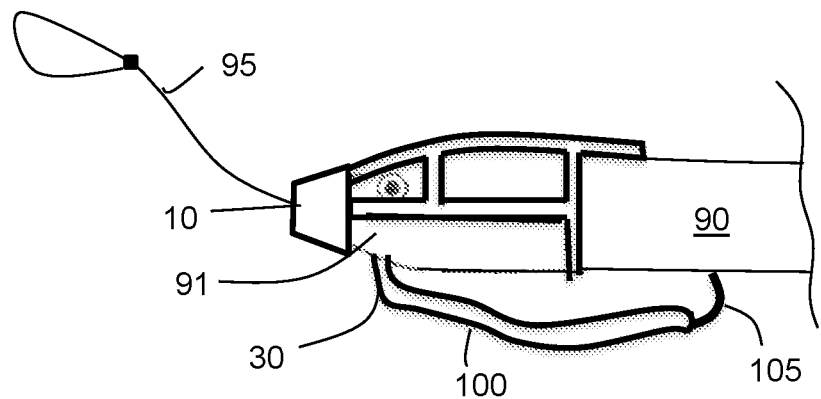
Figure 7C:
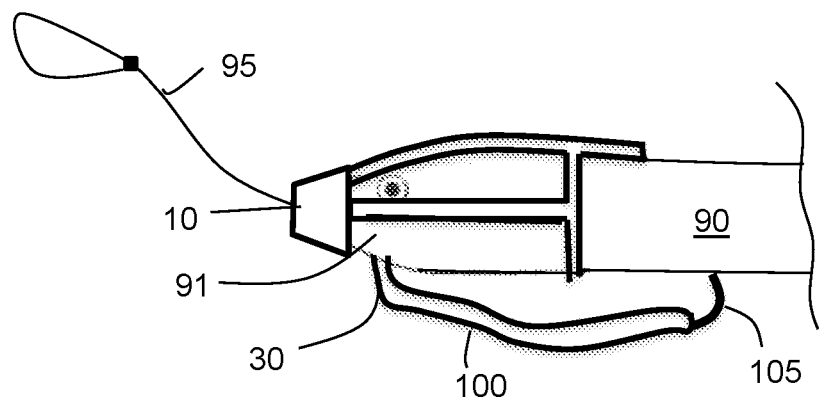

FIG. 7a illustrates one embodiment of device 5 configured over the head of an artificial fishing lure 90. As shown, the front portion of head 91 of the lure is positioned within nose 10 of the device. Fishing line 95 from the lure extends through the opening configured in first end 40 of the device nose. Further, hook guard 100 is positioned over peg 30 and the lure fishing hook 105. In this way, the hook is not exposed, preventing excess grass from being snagged by the lure. The hook guard can have any desired configuration, such as (but not limited to) the shape of a worm. Advantageously, the device is designed so that it will not interfere with the trolling head lure or chin weighted bait. The user can then use the lure rigged with device 5 for trolling or fishing as normally used. The term "trolling" refers to a method of fishing where one or more baited fishing lines are drawn through the water, such as behind a moving boat. The term "fishing" broadly refers to the act of catching fish using a fishing pole or other implement. Advantageously, snagging or weeding of the lure is reduced or eliminated. FIG. 7b illustrates an alternate embodiment configured without lower arm 21.

In some embodiments, device 5 can further be used to rig lure 90 without the need for an additional method of securing the bait to the hook. In these embodiments, the device is positioned over the head of an unrigged lure. Once the device is in position the lure can easily be rigged using methods well known in the art. Specifically, the user can use device 5 to rig bait without the requirement of other mechanical elements, such as wire, rubber bands, thimbles, and the like.

Device 5 includes many advantages over prior art lures. Most importantly, the device reduces or prevents grass from being snagged by lure hook 105.

Because the user is not having to remove grass from the lure, fishing is a more enjoyable experience, and the user does not waste time having to remove grasses and weeds from the lure.

The disclosed device has proven to be a useful method of rigging a lure (e.g., ballyhoo), whether using the weedless device with or without a plastic worm (e.g., with peg 30). The method is faster and easier than other accepted methods of rigging ballyhoo, spring thimble, wire, rubber bands, copper strand, and the like. Accordingly, the device can be used in either configuration as deemed appropriate by the angler.

The device is simple to use by virtue of being able to use the weedless head without having to cut the line or remove the trolling rig when grass or debris is caught. Device 5 is convenient to use and can be carried loosely in a tackle box or with other fishing accessories.

The disclosed device is easy to use and can be applied over the head of an artificial lure by most users, including children and the elderly.

In addition, due to the tapered shape of device 5, the device is self-locating and can be properly positioned with no significant user intervention.

Exemplary embodiments of the methods and components of the presently disclosed subject matter have been described herein. As noted elsewhere, these embodiments have been described for illustrative purposes only, and are not limiting. Other embodiments are possible and are covered by the presently disclosed subject matter. Such embodiments will be apparent to persons skilled in the relevant art(s) based on the teachings contained herein. Thus, the breadth and scope of the present invention should not be limited by any of the above-described exemplary embodiments but should be defined only in accordance with the following claims and their equivalents.

What is claimed is:

1. A device for use with a fishing lure, the device comprising:
   a first device end and a second device end, with a length of the device therebetween;
   a nose positioned at the first device end, the nose comprising a first nose end, a second nose end, and a body therebetween with an interior nose channel that spans from the first nose end to the second nose end, and a conduit positioned on an upper surface of the body that spans a length of the nose, wherein the conduit is in fluid communication with the interior nose channel and wherein the conduit is configured in a straight line between the first nose end and the second nose end such that there is only a single straight line conduit pathway between the first nose end and the second nose end;
   a first upper arm and a second upper arm, wherein the first upper arm connects with the second nose end at a first end of the first upper arm and includes a length and a second end of the first upper arm that is distal to the first end of the first upper arm, and wherein the second upper arm connects with the second nose end at a first end of the second upper arm and includes a length and a second end of the second upper arm that is distal to the first end of the second upper arm, wherein the first upper arm and the second upper arm are attached to the nose on either side of the nose conduit, and wherein the first end of the first upper arm has a width that is less than the second end of the first upper arm, and wherein the first end of the second upper arm has a width that is less than the second end of the second upper arm;
   an upper channel extending between the upper arms, the upper channel aligned with the nose conduit;
   a plurality of U-shaped ribs positioned along the length of the device, each U-shaped rib of the plurality of U-shaped ribs defined by a bottom point that attaches to a lower arm, a first rib end that attaches to the first upper arm, and a second rib end that attaches to the second upper arm, wherein the U-shaped ribs increase successively in diameter as the U-shaped ribs advance away from the nose such that each U-shaped rib has a unique diameter relative to a remainder of the U-shaped ribs;
   wherein the second end of each of the first and second arms is a free end that extends past the plurality of U-shaped ribs.

2. The device of claim 1, wherein the lower arm is defined by a first end that connects with the second end of the nose.

3. The device of claim 2, wherein the lower arm comprises a removable segment positioned between the second end of the nose and a first rib of the plurality of U-shaped ribs positioned directly adjacent to the nose.

4. The device of claim 1, further comprising a peg attached to a bottom surface of the lower arm.

5. The device of claim 4, further comprising a hook guard defined by a first end and a second end, wherein the first end is releasably attached to the peg and the second end is configured to be releasably attached to a hook of an artificial or dead fishing lure.

6. The device of claim 1, wherein the nose is tapered from the first nose end to the second nose end.

7. The device of claim 1, wherein the plurality of U-shaped ribs comprises about 2-5 U-shaped ribs.

8. The device of claim 1, wherein the device is configured to be positioned over only the head and an area adjacent to the head of a bait fish.

9. A kit for use with artificial or dead fishing lures, the kit comprising:
   a plurality of the devices of claim 1;
   wherein each device of the plurality of devices of claim 1 has a length, thickness, or both that differs from at least one other device of the plurality of devices of claim 1, thereby providing a series of devices of the plurality of devices of claim 1 with varying lengths, thicknesses, or both for use with a variety of artificial or dead fishing lures.

10. The kit of claim 9, wherein one or more devices of the plurality of devices of claim 1 further comprises the lower arm defined by a first end that connects with the second end of the nose, wherein the lower arm includes a length that attaches to the bottom point of each rib of the plurality of U-shaped ribs.

11. The kit of claim 10, wherein the lower arm of one or more devices of the plurality of devices of claim 1 comprises a removable segment positioned between the second end of the nose and the rib of the plurality of U-shaped ribs positioned adjacent to the nose.

12. A method of reducing or eliminating snagging of vegetation on an artificial or dead fishing lure comprising a head and a body, the method comprising:

positioning the device of claim 1 over the head of the fishing lure such that the head of the fishing lure is positioned within the interior channel of the nose;

rigging the fishing lure, wherein fishing line from the lure extends through the channel of the nose, extending out from the nose first end;

positioning a first end of a hook guard over a device peg configured on the lower arm of the device, wherein the hook guard comprises the first end and an opposed second end;

positioning the second end of the hook guard over a hook of the artificial or dead fishing lure such that a sharp end of the hook is covered by the hook guard;

connecting the lure to a fishing pole via the fishing line and trolling or fishing;

wherein an amount of vegetation snagged by the lure is eliminated or reduced compared to fishing lures without the device.

13. The method of claim 12, wherein the area between each rib of the plurality of U-shaped ribs along the length of the device comprises an aperture.

14. The method of claim 12, wherein a rib of the plurality of U-shaped ribs directly adjacent to the second end of the nose has a diameter that is greater than the diameter of the nose, and wherein the rib of the plurality of U-shaped ribs directly adjacent to the rib of the plurality of U-shaped ribs adjacent to the nose has a diameter that is greater than both the second end of the nose and the rib of the plurality of U-shaped ribs directly adjacent to the nose.

15. The method of claim 12, wherein the lower arm is defined by a first end that connects with the second end of the nose, wherein the lower arm includes a length that attaches to the bottom point of each rib of the plurality of U-shaped ribs.

16. The method of claim 14, wherein the lower arm comprises a removable segment positioned between the second end of the nose and the rib of the plurality of U-shaped ribs positioned adjacent to the nose.

* * * * *